(12) United States Patent
Oda et al.

(10) Patent No.: US 12,111,660 B2
(45) Date of Patent: Oct. 8, 2024

(54) AUTONOMOUS MOVEMENT SYSTEM, AUTONOMOUS MOVEMENT METHOD, AND AUTONOMOUS MOVEMENT PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 300 days.

(21) Appl. No.: 17/530,590

(22) Filed: Nov. 19, 2021

(65) Prior Publication Data
US 2022/0244730 A1  Aug. 4, 2022

(30) Foreign Application Priority Data
Feb. 3, 2021 (JP) ................. 2021-015378

(51) Int. Cl.
*G05D 1/00* (2024.01)
*B66B 5/00* (2006.01)

(52) U.S. Cl.
CPC ........ *G05D 1/0212* (2013.01); *B66B 5/0012* (2013.01); *G05D 1/0088* (2013.01)

(58) Field of Classification Search
CPC ........... G05D 1/0212; G05D 1/0088; G05D 2201/0211; G05D 1/0282; G05D 1/0214; B66B 5/0012; B66B 1/468; B66B 13/146; B66B 13/165; B66B 17/20; B66B 2201/211; B66B 2201/4615; B66B 2201/4653; B66B 2201/4669
USPC .......................................... 901/1
See application file for complete search history.

(56) References Cited

U.S. PATENT DOCUMENTS

| | | | |
|---|---|---|---|
| 2012/0041593 A1* | 2/2012 | Ichinose | B66B 1/2458 700/258 |
| 2019/0084792 A1 | 3/2019 | Kuroda | |
| 2019/0248002 A1* | 8/2019 | Deyle | B25J 19/023 |
| 2019/0315592 A1 | 10/2019 | Machida et al. | |

FOREIGN PATENT DOCUMENTS

| | | |
|---|---|---|
| CN | 109789998 A | 5/2019 |
| JP | 2020121833 A | 8/2020 |
| WO | 2017199343 A1 | 11/2017 |
| WO | 2018/066056 A1 | 4/2018 |

* cited by examiner

*Primary Examiner* — Anne Marie Antonucci
*Assistant Examiner* — Jodi Jones
(74) *Attorney, Agent, or Firm* — Dickinson Wright, PLLC (57) ABSTRACT

An autonomous movement system according to an embodiment is an autonomous movement system that performs autonomous movement in a facility including an elevator, in which the autonomous movement system moves a waiting position in a car of the elevator, based on a person that gets on the car or an object that gets on the car. The autonomous movement system may determine the person or the object before the car stops at a floor or before a car door opens.

14 Claims, 8 Drawing Sheets

AUTONOMOUS MOVEMENT SYSTEM, AUTONOMOUS MOVEMENT METHOD, AND AUTONOMOUS MOVEMENT PROGRAM

CROSS-REFERENCE TO RELATED APPLICATION

This application claims priority to Japanese Patent Application No. 2021-015378 filed on Feb. 3, 2021, incorporated herein by reference in its entirety.

BACKGROUND

1. Technical Field

The present disclosure relates to an autonomous movement system, an autonomous movement method and an autonomous movement program.

2. Description of Related Art

WO2017/199343 describes an elevator system that moves an autonomous movement device to a position near a door in the case where a floor where a car of an elevator arrives is a destination floor for the autonomous movement device.

SUMMARY

In the case where a person or an object gets on the elevator at a floor before the destination floor, the autonomous movement device can block the movement path for the person or the object.

The present disclosure has been made for solving the problem, and provides an autonomous movement system, an autonomous movement method and an autonomous movement program that makes it possible to restrain the blocking of the movement path for the person or the object.

An autonomous movement system according to an embodiment is an autonomous movement system that performs autonomous movement in a facility including an elevator, in which the autonomous movement system moves a waiting position in a car of the elevator, based on a person that gets on the car or an object that gets on the car. By this configuration, it is possible to restrain the blocking of the movement path for the person or the object.

The above autonomous movement system may determine the person or the object before the car stops at a floor or before a door of the car opens, and may move the waiting position before the car stops at the floor or before the door of the car opens. By this configuration, it is possible to shorten a time during which the car stops at the floor.

In a case where the car arrives at a destination floor for the autonomous movement system before the car arrives at a destination floor for the person or the object, the above autonomous movement system may once get off the car on a floor where the person or the object gets on the car, and may get on the car after the person or the object gets on the car. By this configuration, it is possible to restrain the interference with the person or the object, and to safely move.

In the above autonomous movement system, the object may be another autonomous movement system, and the autonomous movement system may acquire information about a destination floor for the other autonomous movement system, before the car stops at a floor or before a door of the car opens. By this configuration, it is possible to restrain a plurality of autonomous movement systems from blocking the movement path for the person or the object.

An autonomous movement system according to an embodiment includes: an autonomous movement device that performs autonomous movement in a facility including an elevator; and a server device that exchanges traveling information with the autonomous movement device, in which the server device moves a waiting position of the autonomous movement device in a car of the elevator, based on a person that gets on the car or an object that gets on the car. By this configuration, it is possible to restrain the blocking of the movement path for the person or the object.

In the above autonomous movement system, the server device may determine the person or the object before the car stops at a floor or before a door of the car opens, and may move the waiting position of the autonomous movement device before the car stops at the floor or before the door of the car opens. By this configuration, it is possible to shorten the time during which the car stops at the floor.

In the above autonomous movement system, in a case where the car arrives at a destination floor for the autonomous movement device before the car arrives at a destination floor for the person or the object, the server device may cause the autonomous movement device to once get off the car on a floor where the person or the object gets on the car, and may cause the autonomous movement device to get on the car after the person or the object gets on the car. By this configuration, it is possible to restrain the interference with the person or the object, and to safely move.

In the above autonomous movement system, as the autonomous movement device, there may be a plurality of autonomous movement devices including a first autonomous movement device and a second autonomous movement device, the autonomous movement device in the car may be the first autonomous movement device, the object may be the second autonomous movement device, and the server device may send information about a destination floor for the second autonomous movement device to the first autonomous movement device, before the car stops at a floor or before a door of the car opens. By this configuration, it is possible to restrain a plurality of autonomous movement systems from blocking the movement path for the person or the object.

An autonomous movement method according to an embodiment is an autonomous movement method for an autonomous movement device that performs autonomous movement in a facility including an elevator, the autonomous movement method including: a step of determining, in a car of the elevator, a person that gets on the car or an object that gets on the car; and a step of moving a waiting position in the car, based on the person or the object. By this configuration, it is possible to restrain the blocking of the movement path for the person or the object.

An autonomous movement program according to an embodiment is an autonomous movement program for an autonomous movement device that performs autonomous movement in a facility including an elevator, the autonomous movement program causing a computer to execute: determining, in a car of the elevator, a person that gets on the car or an object that gets on the car; and moving a waiting position in the car, based on the person or the object. By this configuration, it is possible to restrain the blocking of the movement path for the person or the object.

With the embodiments, it is possible to provide an autonomous movement system, an autonomous movement method and an autonomous movement program that make it possible to restrain the blocking of the movement path for the person or the object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure will be described below with embodiments of the present disclosure. The disclosure according to the claims is not limited to embodiments described below. Further, all of configurations described in the embodiments are not needed as means for solving the problem. For clear explanation, in the following descriptions and drawings, omission and simplification are performed when appropriate. In the drawings, identical elements are denoted by identical reference characters, and repetitive descriptions are omitted as necessary.

Embodiment 1

An autonomous movement system according to Embodiment 1 will be described. In the embodiment, an autonomous movement system may be replaced by an autonomous movement device, and the autonomous movement device may be replaced by the autonomous movement system. Further, it may be understood that the autonomous movement system in the embodiment includes the autonomous movement device. The autonomous movement device performs autonomous movement in a predetermined facility. For example, the autonomous movement device may be a mobile robot that performs autonomous movement, or may be a carrying robot that performs autonomous movement for carrying an article. The mobile robot will be described below as an example of the autonomous movement device. The mobile robot will be described by being divided into Configuration of Mobile Robot and Behavior of Mobile Robot.

Configuration of Mobile Robot

Figure 1:
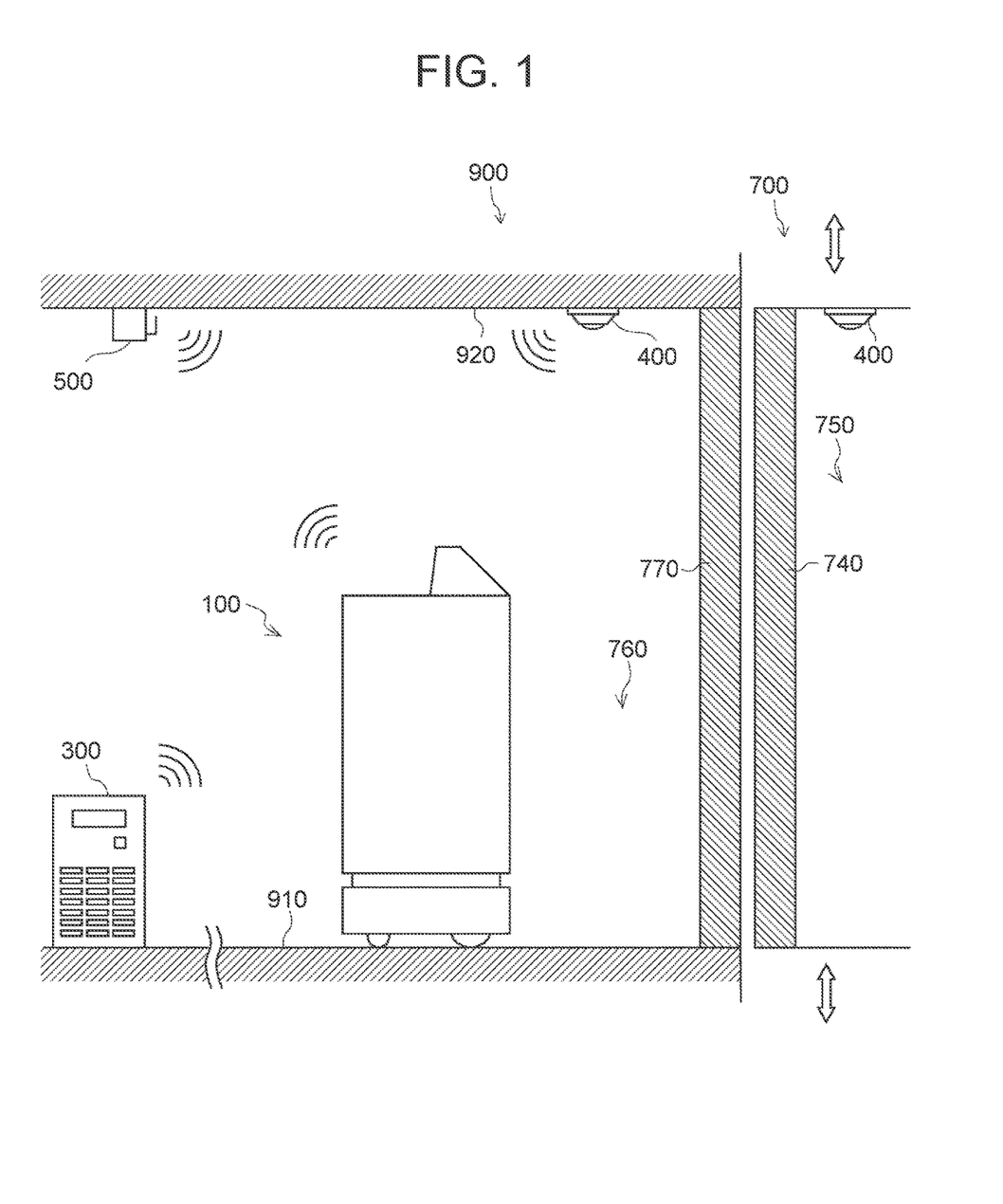
FIG. 1 is a schematic diagram exemplifying a mobile robot according to Embodiment 1.

FIG. 1 is a schematic diagram exemplifying a mobile robot according to Embodiment 1. As shown in FIG. 1, a mobile robot 100 is an example of an autonomous movement device that performs autonomous movement in a facility 900 including an elevator 700. For example, the facility 900 is a hospital. The predetermined facility 900 is not limited to the hospital, and may be a hotel, a shopping mall or the like, as long as the facility 900 includes the elevator 700 and the mobile robot 100 can perform autonomous movement in the facility 900.

The mobile robot 100 performs autonomous movement on a floor surface 910 in the facility 900. A facility camera 400 is fixed in the facility 900. A plurality of facility cameras 400 may be provided in the facility 900. For example, the facility camera 400 is fixed on a ceiling 920 of the facility 900, and photographs the periphery of the facility camera 400, to generate image data.

The facility camera 400 may be fixed on the ceiling 920 of a floor where a car 750 of the elevator 700 stops, and may photograph an elevator hall 760. The elevator hall 760 is disposed near an elevator door 770. The elevator door 770 opens or closes together with a door (referred to as a car door 740) of the car 750 stopped at a floor where the elevator door 770 is provided. The facility camera 400 may be fixed on the ceiling 920 of the car 750 of the elevator 700, and may photograph the interior of the car 750. The car 750 is a box-shaped structure that contains a person or an object and that rises or falls from a position contacting with the elevator hall 760.

The mobile robot 100 and the facility camera 400 are connected so as to communicate with each other through information transmission means such as wireless communication. For example, the mobile robot 100 and the facility camera 400 may be connected so as to directly communicate, or may be connected so as to communicate through an access point 500 and a server device 300. Consequently, the mobile robot 100 may directly acquire the image data from the facility camera 400, or may acquire the image data through the access point 500 and the server device 300.

For example, the access point 500 is an access point for a wireless LAN. The access point 500 is fixed in the facility 900, and acquires position information, traveling information and the like from the mobile robot 100 inside a predetermined range in the periphery of the access point 500. In the facility 900, a plurality of access points 500 may be provided. The access point 500 may be fixed on the ceiling 920 of the elevator hall 760, and may be fixed on the ceiling 920 of the car 750 of the elevator 700.

In the facility 900, a plurality of mobile robots 100 may perform autonomous movement. The plurality of mobile robots 100 may be connected so as to communicate with each other through information transmission means such as wireless communication. For example, the plurality of mobile robots 100 may be connected so as to directly communicate with each other, or may be connected so as to communicate with each other through the access point 500 and the server device 300.

Figure 2:
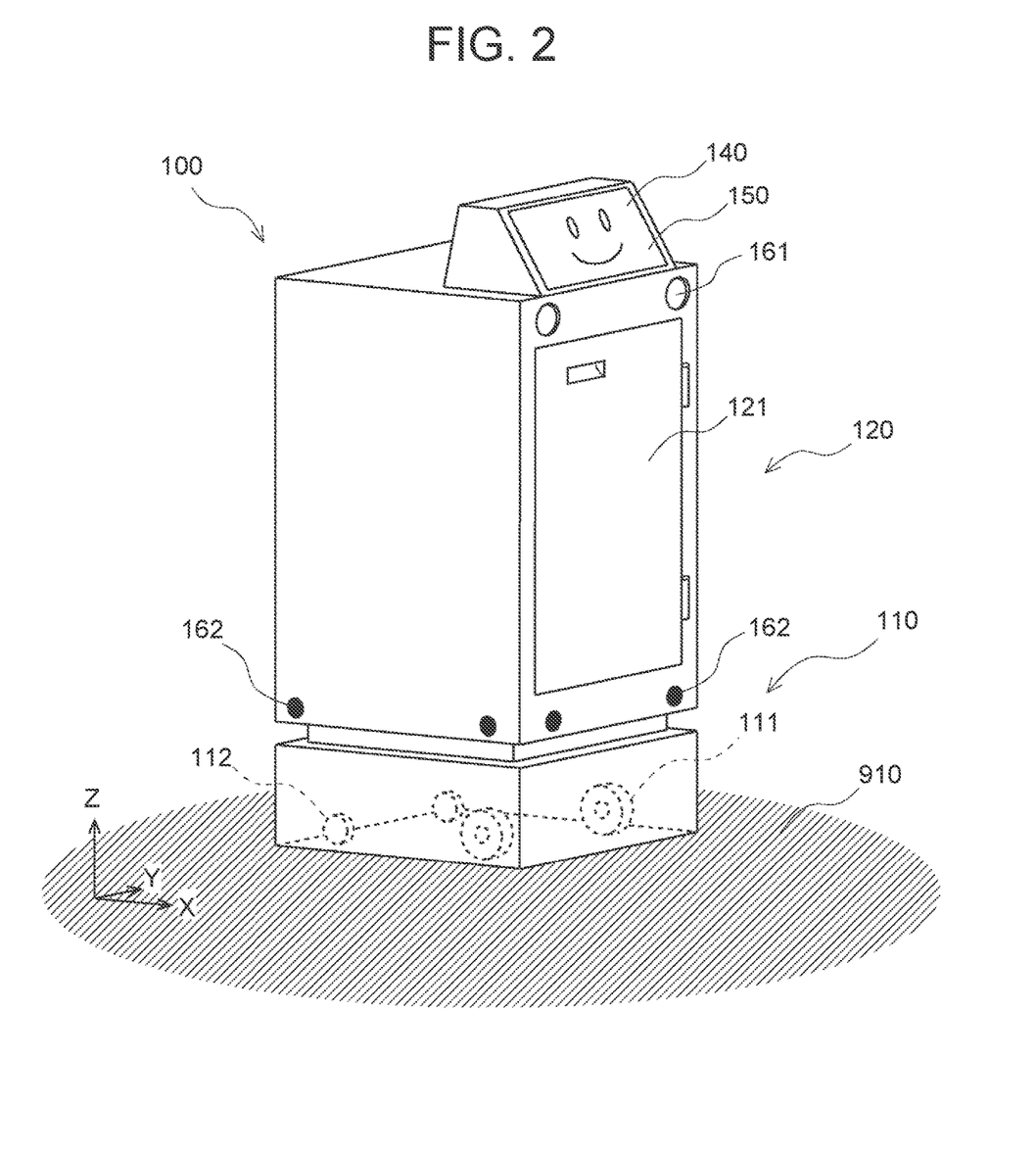
FIG. 2 is a perspective view exemplifying the mobile robot according to Embodiment 1.
Figure 3:
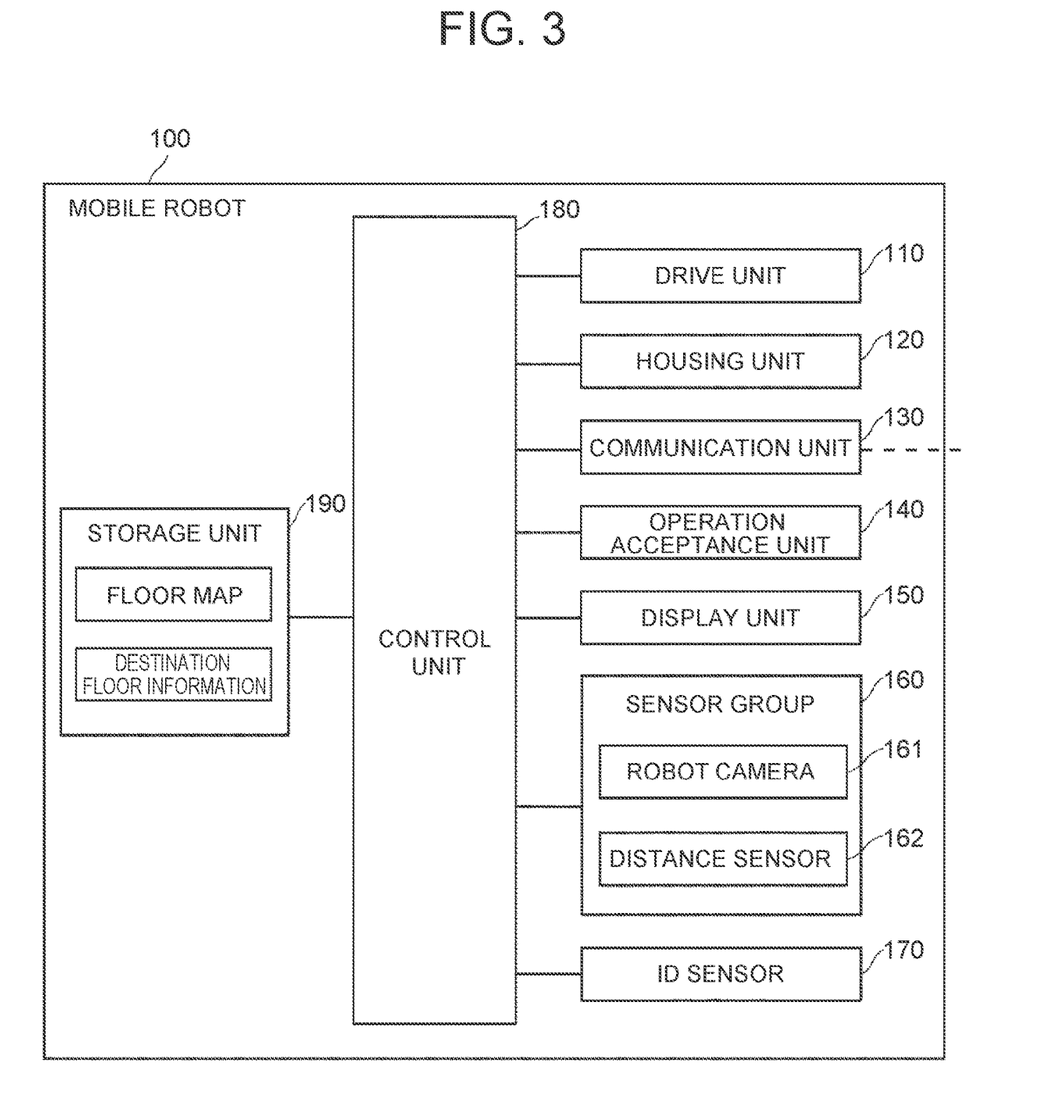
FIG. 3 is a block diagram exemplifying the mobile robot according to Embodiment 1.

FIG. 2 is a perspective view exemplifying the mobile robot 100 according to Embodiment 1. FIG. 3 is a block diagram exemplifying the mobile robot 100 according to Embodiment 1. As shown in FIG. 2 and FIG. 3, the mobile robot 100 includes a drive unit 110, a housing unit 120, a communication unit 130, an operation acceptance unit 140, a display unit 150, a sensor group 160, an ID sensor 170, a control unit 180, and a storage unit 190.

As shown in FIG. 2, the mobile robot 100 is a mobile body that moves on the floor surface 910 as a movement surface. Here, an XYZ orthogonal coordinate axis system is used for convenience of description of the mobile robot 100. The floor surface 910 is on an X-Y plane, and the upward direction is a +Z-axis direction.

The drive unit 110 functions as movement means for the mobile robot 100. The drive unit 110 includes two drive wheels 111 contacting with the floor surface 910 and casters 112 contacting with the floor surface. The two drive wheels 111 are set so as to rotate about one rotation shaft extending in a direction (a right-left direction or a Y-axis direction in the figure) orthogonal to a straight-ahead direction (a front-rear direction or an X-axis direction in the figure), independently from each other. The mobile robot 100 performs forward movement or rearward movement by driving the drive wheels 111 disposed on right and left sides at an identical rotation number, and performs turning by making a difference in rotation speed or rotation direction between the right and left drive wheels 111. The drive unit 110 drives the drive wheels 111 in response to an instruction from the control unit 180.

The housing unit 120 is disposed above the drive unit 110 in the mobile robot 100. The housing unit 120 may include a containing chamber door 121. When the containing chamber door 121 is opened, a containing chamber for containing a predetermined article is provided within the housing unit 120. That is, the mobile robot 100 can serve as a carrying robot that carries the predetermined article. The housing unit 120 may open or close the containing chamber door 121 in response to an instruction from the control unit 180.

As shown in FIG. 3, the communication unit 130 is an interface for communicable connection with the exterior. For example, the communication unit 130 includes an antenna, a circuit that performs modulation or demodulation of a signal to be sent through the antenna, and the like. The communication unit 130 receives the image data directly from the facility camera 400 or through the access point 500 and the server device 300.

The communication unit 130 may exchange information relevant to a destination, information of whether to move, position information, traveling information, destination floor information and the like, with the server device 300. Further, the communication unit 130 may exchange the position information, the traveling information, the image data, the destination floor information and the like with another mobile robot 100, directly or through the access point 500 and the server device 300.

The communication unit 130 may periodically send a heartbeat signal to the server device 300. The heartbeat signal may include log data indicating the state of the mobile robot 100 in a chronological order. Further, the heartbeat signal may include an identification (ID) of the mobile robot 100 and an ID of a user.

The communication unit 130 is connected with the control unit 180. The communication unit 130 outputs a signal including information sent from the facility camera 400 and the server device 300, to the control unit 180, and sends a signal output from the control unit 180, to the server device 300.

The operation acceptance unit 140 accepts an input operation from the user, and sends an operation signal to the control unit 180. As means for accepting the input operation from the user, the operation acceptance unit 140 may include an operation button, or a touch panel superimposed on the display unit 150, for example. By operating the input operation means, the user turns an electric power source on or off, and opens or closes the containing chamber door 121.

For example, the display unit 150 is provided on an upper surface of the housing unit 120, so as to protrude. For example, the display unit 150 is a display unit that includes a rectangular liquid crystal panel. The display unit 150 appropriately displays information in response to an instruction from the control unit 180. A touch panel that accepts an operation from the user may be superimposed on the display unit 150.

The sensor group 160 includes a sensor that acquires data necessary for the autonomous movement of the mobile robot 100. For example, the sensor group 160 includes a robot camera 161 and a distance sensor 162. The sensor group 160 may include a sensor other than the robot camera 161 and the distance sensor 162.

For example, the robot camera 161 is disposed at an upper portion of the housing unit 120 below the display unit 150. As the robot camera 161, two camera units having an identical angular field may be disposed so as to be horizontally away from each other. Thereby, images photographed by the respective camera units are output to the control unit 180 as the image data.

In the case where the mobile robot 100 is in the elevator hall 760, the robot camera 161 may photograph the elevator hall 760. In the case where the mobile robot 100 is in the car 750 of the elevator 700, the robot camera 161 may photograph the interior of the car 750.

For example, the distance sensor 162 is disposed at a lower portion of the housing unit 120. The distance sensor 162 may be disposed at each lower portion of a +X-axis direction side surface, a −X-axis direction side surface, a +Y-axis direction side surface and a −Y-axis direction side surface of the housing unit 120. The distance sensor 162 measures the distance from a physical body in the periphery of the mobile robot 100. The control unit 180 analyzes the image data output by the robot camera 161 and a detection signal output by the distance sensor 162. Thereby, the control unit 180 recognizes an obstacle in the periphery of the mobile robot 100, and measures the distance between the mobile robot 100 and the obstacle.

For example, the ID sensor 170 is provided near the display unit 150. The ID sensor 170 identifies the ID of the user that operates the mobile robot 100, and detects a unique identifier included in an ID card that is owned by the user. For example, the ID sensor 170 includes an antenna for reading information in a wireless tag. The user puts the ID card close to the ID sensor 170, and thereby causes the mobile robot 100 to recognize the ID of the user that is an operator.

The control unit 180 is an information processing device that includes a computation device such as a central processing unit (CPU). The control unit 180 includes hardware in the control unit 180 and programs stored in the hardware. That is, a process to be executed by the control unit 180 is realized by one of hardware and software.

The control unit 180 acquires a variety of information from the respective constituents, and gives instructions to the respective constituents depending on the acquired information. For example, the control unit 180 detects the distance between the mobile robot 100 and a physical body in the periphery of the mobile robot 100, from the image data acquired from the robot camera 161, the information about the peripheral physical body acquired from the distance sensor 162, and the like. Then, the control unit 180 calculates a route to the destination, from the detected distance, the position information, the traveling information and the like. The control unit 180 gives an instruction for moving along the calculated route, to the drive unit 110. In the case of executing this process, the control unit 180 refers to information about a floor map and the destination floor information that are stored in the storage unit 190.

Further, the control unit 180 may determine the mobile robot 100, person, object and others that wait in the elevator hall 760, based on the image data acquired from the facility camera 400 or the robot camera 161, and may calculate the numbers of mobile robots 100, persons, objects and others. Furthermore, the control unit 180 may determine the mobile robot 100, person, object and others in the car 750 of the elevator 700, based on the image data acquired from the facility camera 400 or the robot camera 161, and may calculate the numbers of mobile robots 100, persons, objects and others.

The storage unit 190 includes a nonvolatile memory such as a flash memory and a solid state drive (SSD). In the storage unit 190, the floor map of the facility that is used for the autonomous movement of the mobile robot 100 is stored. Further, in the storage unit 190, destination floor information about another mobile robot 100, the person, the object and others is stored. The storage unit 190 is connected with the control unit 180, and outputs the stored information to the control unit 180, in response to a request from the control unit 180.

As shown in FIG. 2, the forward side of the mobile robot 100 is a +X-axis direction side on which the robot camera 161 is installed. For the definition of the forward side of the mobile robot 100, various concepts can be employed. For example, the forward side can be defined based on how the sensor group 160 for recognizing the peripheral environment is disposed. Specifically, the forward side is defined as the +X-axis direction side of the housing unit 120 on which a sensor having a high recognition capability is disposed or many sensors are disposed. When the forward side is defined in this way, the mobile robot 100 can move while recognizing the peripheral environment more accurately. For the mobile robot 100 in the embodiment, the forward side is defined as the +X-axis direction side on which the robot camera 161 is disposed.

Alternatively, the forward side can be defined based on how the display unit 150 is disposed. When the display unit 150 displays the face of a character or the like, a person in the periphery naturally recognizes that the forward side of the mobile robot 100 is the side of the display unit 150. Hence, when the forward side is defined as the side of a display surface of the display unit 150, the person in the periphery does not have a strong strangeness feeling. For the mobile robot 100 in the embodiment, the forward side is defined as the side of the display surface of the display unit 150.

Further, the forward side may be defined based on the housing shape of the mobile robot 100. For example, in the case where the projection shape on a traveling surface of the housing unit 120 is a rectangle, the housing unit 120 does not interfere with a passing person at the time of movement when the forward side is a shorter side, compared to when the forward side is a longer side. That is, depending on the housing shape, there is a housing surface that preferably should be the forward side at the time of the ordinary movement. For the mobile robot 100 in the embodiment, the forward side is defined as the shorter side of the rectangle. As described above, the forward side of the mobile robot 100 is defined based on some concepts. The concept from which the forward side is defined may be decided in consideration of the shape, role and others of the mobile robot.

Behavior of Mobile Robot

Next, a behavior of the mobile robot in the embodiment will be described. For example, the user turns on the electric power source of the mobile robot 100. Then, the user inputs a desired task to the operation acceptance unit 140. When the user turns on the electric power source or when the user operates the operation acceptance unit 140, the ID of the user is identified by the ID sensor 170, as necessary.

For carrying an article as the desired task, the user operates the operation acceptance unit 140, opens the containing chamber door 121, and puts the article in the containing chamber. Then, the user operates the operation acceptance unit 140, and closes the containing chamber door 121. Next, the user inputs a carry destination of the article from the operation acceptance unit 140. The user may input the destination floor information. The control unit 180 of the mobile robot 100 searches a route to the carry destination using the floor map stored in the storage unit 190. The control unit 180 may derive the destination floor information. The mobile robot 100 performs autonomous movement along the searched route.

Figure 4:
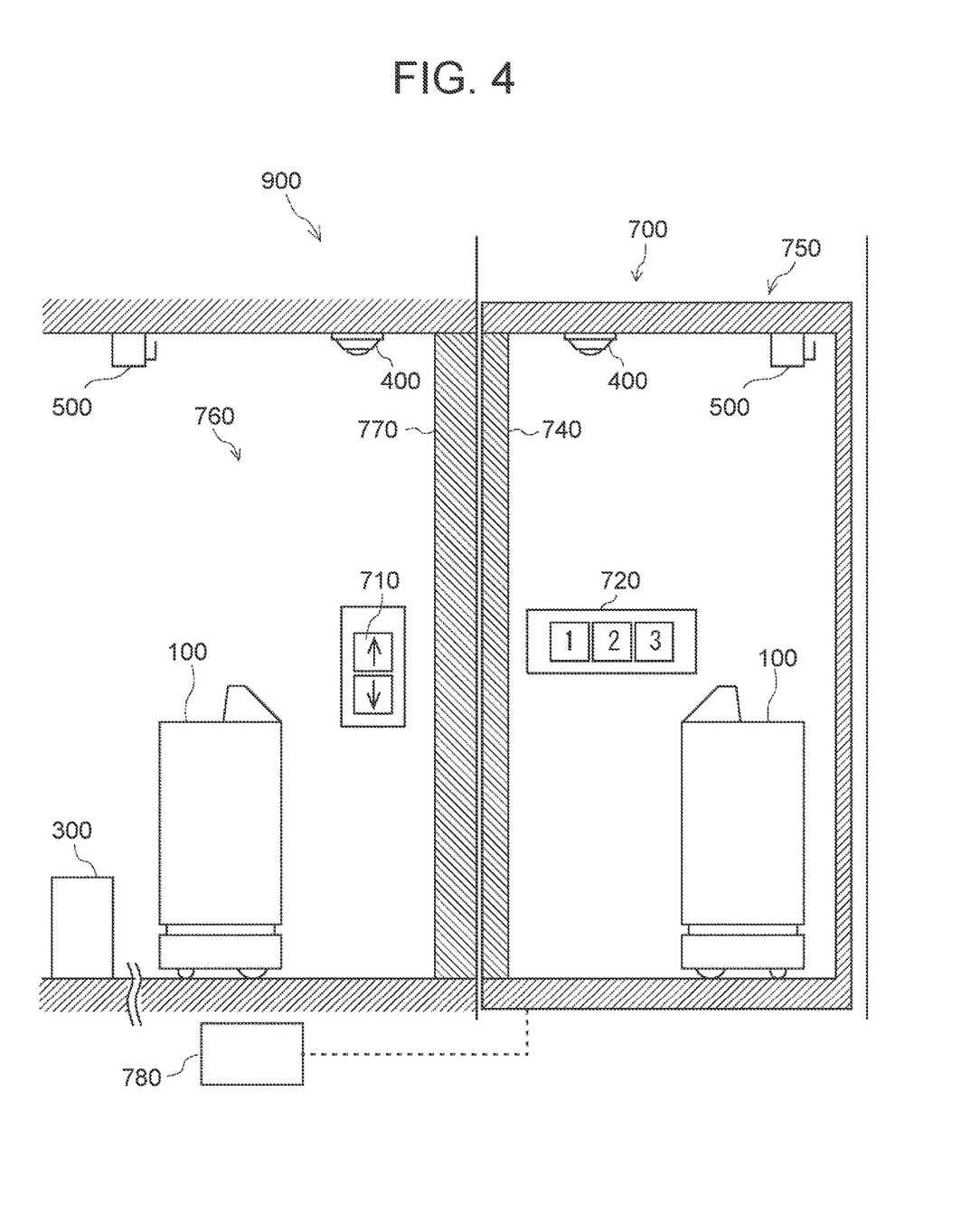
FIG. 4 is a conceptual diagram exemplifying an elevator in a facility according to Embodiment 1.

FIG. 4 is a conceptual diagram exemplifying the elevator 700 in the facility 900 according to Embodiment 1. As shown in FIG. 4, the facility 900 includes the elevator 700. The rise and fall of the car 750 of the elevator 700 may be controlled by an elevator control unit 780 provided in the facility 900.

The elevator control unit 780 is connected with a call switch 710 and a destination switch 720 in a communicable manner. The call switch 710 and the destination switch 720 may be connected with the mobile robot 100 and the server device 300 in a communicable manner.

For example, the call switch 710 is disposed near the elevator door 770 of each floor where the car 750 stops. The call switch 710 calls the car 750 of the elevator 700 to the floor. A person that hopes to get on the car 750 turns the call switch 710 on. Then, the elevator control unit 780 causes the car 750 to rise or fall to a floor for which the call switch 710 is turned on, and stop at the floor.

The destination switch 720 is disposed in the car 750. The destination switch 720 allows the selection of the destination floor for the car 750. A person gets on the car 750, and selects the destination floor through the destination switch 720. Then, the elevator control unit 780 causes the car 750 to rise or fall to the destination floor selected through the destination switch 720, and stop at the floor.

In the case where the total weight of persons and objects that have got on the car 750 is equal to or more than a predetermined weight, the elevator control unit 780 may output a display of over-weight, and may sound a buzzer when any further person or object gets on the car 750. Further, in the case where the total weight is equal to or more than the predetermined weight, the elevator control unit 780 stops the car 750 only at a floor selected through the destination switch 720, such that any further person or object does not get on the car 750. In this way, the elevator control unit 780 provided in the facility 900 controls the rise-fall and stop of the elevator 700.

The elevator control unit 780 may be connected with the mobile robot 100 in a communicable manner, directly or through the server device 300 and the access point 500. The server device 300 may control some functions of the elevator control unit 780. Further, the server device 300 may have some functions of the elevator control unit 780. For example, the server device 300 may cause the car 750 to rise or fall to a floor where the call switch 710 is turned on, and stop at the floor, or may cause the car 750 to rise or fall to a floor selected through the destination switch 720, and stop at the floor. In this way, the server device 300 may control the rise and fall of the car 750.

The mobile robot 100 may have a fixed position for waiting, in the car 750 of the elevator 700. For example, the mobile robot 100 may adopt a predetermined position in the car 750, as the fixed position. For example, the mobile robot 100 may adopt the back of the car 750 as the fixed position, such that many persons and objects can get on the car 750. Further, the mobile robot 100 may adopt a position facing the destination switch 720 as the fixed position, such that space is provided near the destination switch 720 and a person having got on the car 750 can operate the destination switch 720. Further, the mobile robot 100 may adopt a position near the car door 740 as the fixed position, such that the mobile robot 100 can get off the car 750 immediately after the arrival at the destination floor.

In this way, the mobile robot 100 may adopt a fixed position in the car 750, as the waiting position. The mobile robot 100 may come close to the car door 740 when the car 750 becomes close to the floor where the mobile robot 100 gets off the car 750. For example, in the case where the mobile robot 100 waits at the back of the car 750 as the fixed position, the mobile robot 100 may move to the front of the car door 740 when the car 750 becomes close to the floor where the mobile robot 100 gets off the car 750. Thereby, the mobile robot 100 can get off the car 750 immediately after the arrival at the destination floor.

The mobile robot 100 may change the waiting position from the fixed position in the car 750, based on the kind of the person that gets on the car 750, the number of persons, the kind of the object that gets on the car 750 and the number of objects.

Figure 5:
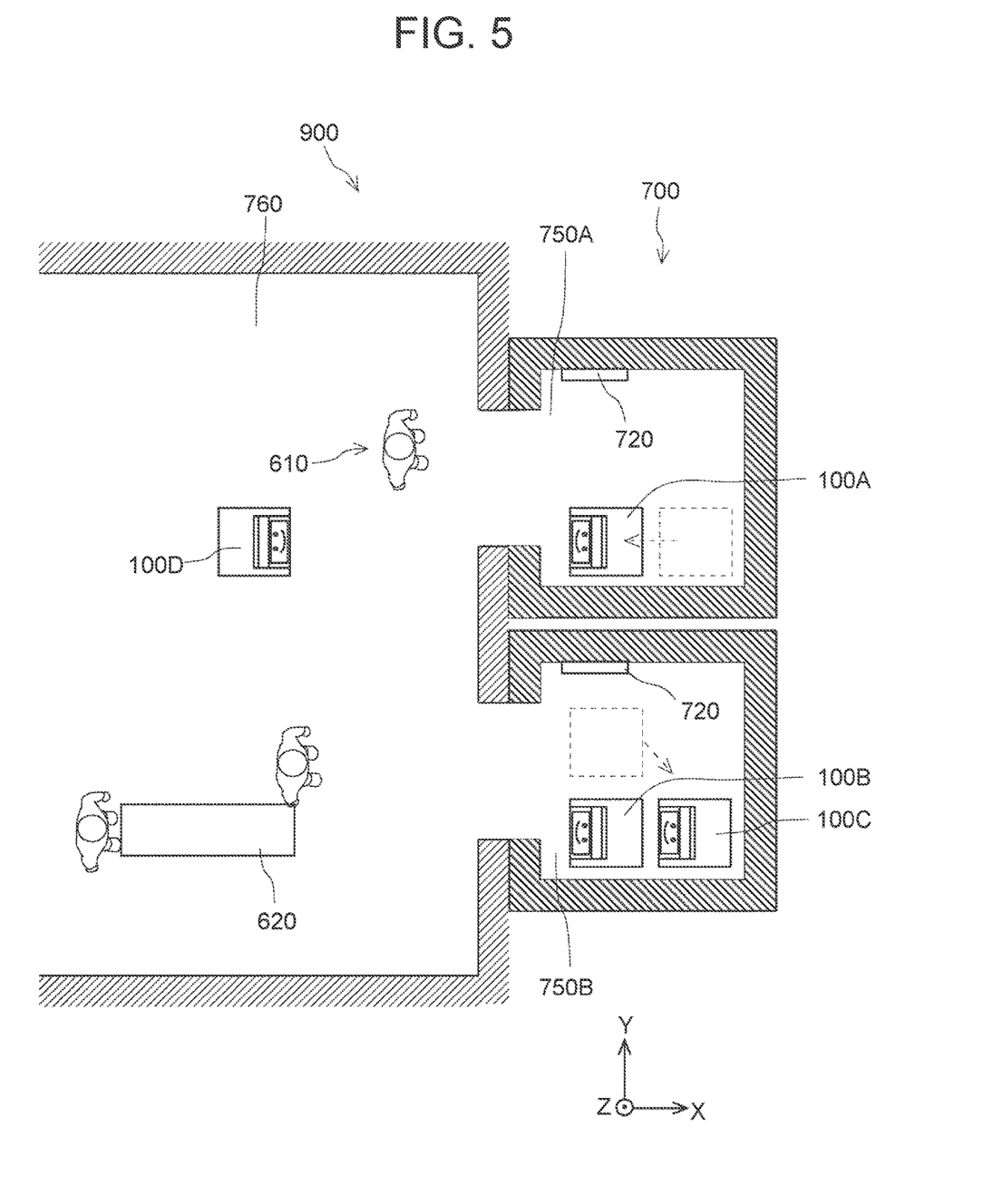
FIG. 5 is a plan view exemplifying a movement method of the mobile robot in the facility including the elevator according to Embodiment 1.

FIG. 5 is a plan view exemplifying a movement method of the mobile robot 100 in the facility 900 including the elevator 700 according Embodiment 1. As shown in FIG. 5, in a car 750A of the elevator 700, a mobile robot 100A moves the waiting position in the car 750A, based on a person 610 that gets on the car 750A. In the case where the mobile robot 100 is collectively indicated, the mobile robot 100 is referred to as a mobile robot 100, and in the case where a particular mobile robot 100 is indicated, the mobile robot 100 is referred to as a mobile robot 100A while "A" or the like is put. The same goes for the car 750.

For example, the mobile robot 100A waits at the back of the car door 740 as the fixed position. In the case where the person 610 that gets on the car 750 is an old person, a patient or the like and uses a handrail in the car 750, the mobile robot 100A moves the waiting position from the vicinity of the handrail to the front of the car door 740. Further, in the case where the person 610 that gets on the car 750A is an old person, a patient or the like, the mobile robot 100A may move the waiting position such that the distance from the old person, the patient or the like is kept, for preventing the old person, the patient or the like from staggering and stumbling.

The mobile robot 100A that adopts the front of the car door 740 as the waiting position may move the waiting position and may provide space in the front of the destination switch 720, such that the person 610 that gets on the car 750A can push the destination switch 720. Further, in the case where the destination floor selected through the destination switch 720 by the person 610 that gets on the car 750A is a floor where the car 750A arrives after the destination floor for the mobile robot 100A, the mobile robot 100A moves the waiting position to the front of the car door 740.

In a car 750B of the elevator 700, mobile robots 100B, 100C move the waiting positions in the car 750B, based on an object 620 that gets on the car 750B. For example, in the case where the object 620 that gets on the car 750B is a stretcher, the mobile robots 100B, 100C move the waiting positions so as to be arrayed along a direction in which the stretcher extends. Specifically, in the case where the stretcher is disposed in the car 750B so as to extend in the X-axis direction in the figure, which is a direction from the car door 740 to the back, the mobile robots 100B, 100C move the waiting positions so as to be arrayed along the X-axis direction. Further, in the case where persons 610 that get on the car 750B are a person 610 in a wheelchair and a person 610 that pushes the wheelchair, the mobile robots 100B, 100C moves so as to be arrayed along the front-rear direction of the wheelchair.

Figure 6:
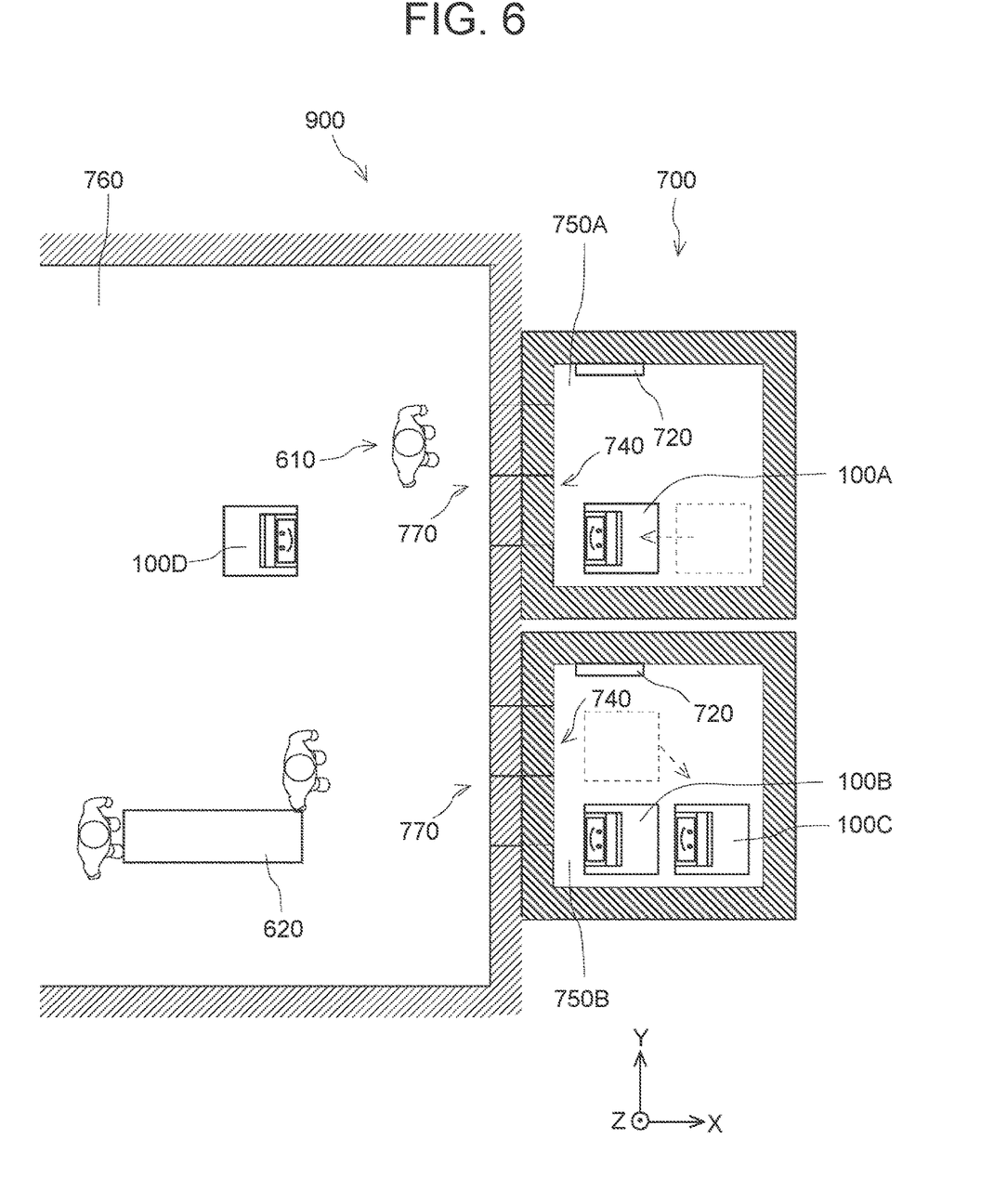
FIG. 6 is a plan view exemplifying a movement method of the mobile robot in the facility including the elevator according to Embodiment 1.

FIG. 6 is a plan view exemplifying a movement method of the mobile robot 100 in the facility 900 including the elevator 700 according to Embodiment 1. As shown in FIG. 6, the mobile robot 100 may determine the person 610 or object 620 that gets on the car 750, before the car 750 stops at the floor or before the car door 740 opens.

For example, the mobile robot 100 may acquire image data about the person 610 or object 620 that gets on the car 750, from the image data of the facility camera 400 that photographs the elevator hall 760. Thereby, the mobile robot 100 can obtain information about the person 610 or object 620 that waits for the car 750 on a floor where the car 750 will stop. Consequently, the mobile robot 100 can determine the person 610 or object 620 that gets on the car 750, before the car 750 stops at the floor or before the car door 740 opens.

The mobile robot 100 may determine whether the mobile robot 100 can wait at the same waiting position even after the person 610 or the object 620 gets on the car 750. In the case where the mobile robot 100 determines that the mobile robot 100 can wait at the same waiting position, the mobile robot 100 waits at the same waiting position with no change. On the other hand, in the case where the mobile robot 100 determines that the mobile robot 100 cannot wait at the same position, the mobile robot 100 moves the waiting position.

For example, the mobile robot 100A waiting at the back of the car door 740 acquires image data about the elevator hall 760. Then, the mobile robot 100A determines that the person 610 that gets on the car 750A is an old person, a patient or the like. In this case, the mobile robot 100A determines that the mobile robot 100A cannot wait at the back of the car door 740 where the handrail is provided.

When the mobile robot 100A determines the person 610 or object 620 that gets on the car 750, the mobile robot 100A may use image data of another mobile robot 100 that photographs the elevator hall 760, other than the image data of the facility camera 400 in the elevator hall 760.

In the case where the mobile robot 100 determines that the mobile robot 100 cannot wait at the same waiting position when the person 610 or the object 620 gets on the car 750, the mobile robot 100 may move the waiting position before the car 750 stops at the floor or before the car door 740 opens. Thereby, it is possible to shorten a time during which the car 750 stops at the floor.

The mobile robot 100 may acquire information about the destination floor for the person 610 or object 620 that waits for the arrival of the car 750 in the elevator hall 760, that is, the person 610 or object 620 that will get on the car 750.

For example, in the case where the object 620 that gets on the car 750A is another mobile robot 100D, the mobile robot 100A in the car 750A may acquire information about the destination floor for the mobile robot 100D, directly or through the server device 300. Consequently, the mobile robot 100A acquires the information about the destination floor for the mobile robot 100D, before the car 750 stops at the floor or before the car door 740 opens.

For example, in the case where the object 620 that gets on the car 750B is a stretcher that goes toward an intensive-care unit in a hospital, the mobile robot 100B in the car 750B may acquire information about the destination floor for the stretcher, from the storage unit 190 or the server device 300. For example, in the case where the object 620 that gets on the car 750B is a container that contains waste, the mobile robot 100B in the car 750B may acquire information about the destination floor for the container, from the storage unit 190 or the server device 300. For example, in the case where the person 610 that gets on the car 750A is a patient that uses a particular patient's room in a hospital, the mobile robot 100A in the car 750A may acquire information about the destination floor for the patient, from the storage unit 190 or the server device 300. Floor information about the intensive-care unit, a waste collection place and the particular patient's room is previously stored in the storage unit 190 and the server device 300. Further, a predetermined person 610 or predetermined object 620 and floor information may be previously associated with each other and may be stored in the storage unit 190 and the server device 300.

The car 750 can arrive at the destination floor for the mobile robot 100 before the car 750 arrives at the destination floor for the person 610 or the object 620. In that case, the mobile robot 100 gets off the car 750 earlier than the person 610 or object 620 that will get on the car 750 later. Consequently, it is preferable that the waiting position of the mobile robot 100 be closer to the car door 740 than the position of the person 610 or the object 620.

Consequently, in the case where the car 750 arrives at the destination floor for the mobile robot 100 before the car 750 arrives at the destination floor for the person 610 or the object 620, the mobile robot 100 once gets off the car 750 on the floor where the person 610 or the object 620 gets on the car 750, and gets on the car 750 after the person 610 or the object 620 gets on the car 750. Thereby, the mobile robot 100 can get off the car 750 immediately after the arrival at the destination floor.

Figure 7:
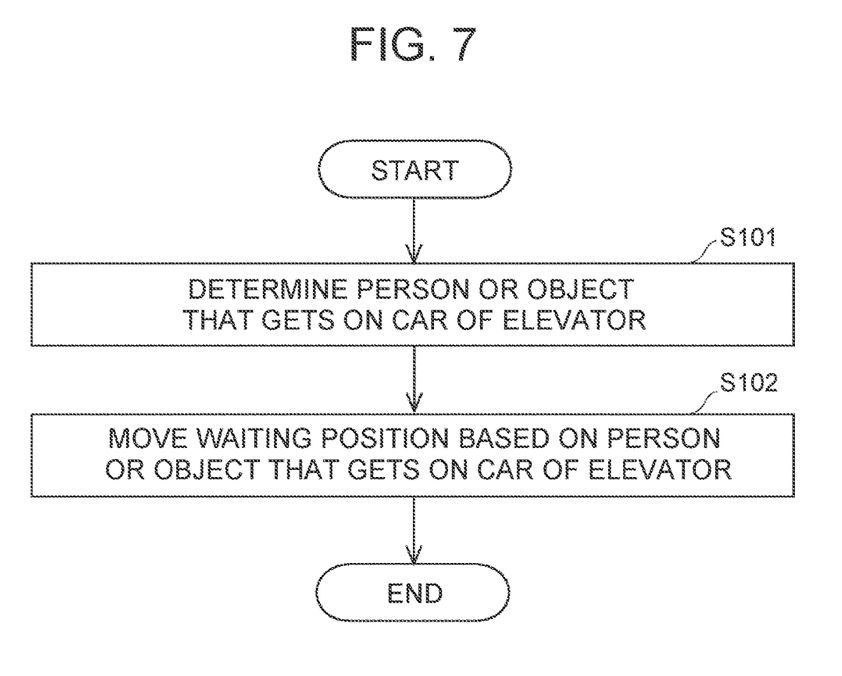
FIG. 7 is a flowchart exemplifying a movement method of the mobile robot in the facility including the elevator according to Embodiment 1.

A movement behavior of the mobile robot 100 in the facility 900 will be described with reference to a flowchart. FIG. 7 is a flowchart exemplifying a movement method of the mobile robot 100 in the facility 900 including the elevator 700 according to Embodiment 1.

As shown in step S101 of FIG. 7, the mobile robot 100 determines the person 610 or object 620 that gets on the car 750 of the elevator 700. For example, the mobile robot 100 may determine the person 610 or object 620 that gets on the car 750, based on the information detected by the sensor group 160, specifically, the image data of the robot camera 161. Further, the mobile robot 100 may determine the person 610 or object 620 that gets on the car 750, based on the image data of the facility camera 400 in the elevator hall 760.

In step S101, the mobile robot 100 may determine the person 610 or the object 620, before the car 750 stops at the floor or before the car door 740 opens. Further, in step S101, the mobile robot 100 may determine the earlier one of the destination floor for the person 610 or the object 620 and the destination floor for the mobile robot 100.

Next, as shown in step S102, the mobile robot 100 moves the waiting position based on the person 610 or object 620 that gets on the car 750 of the elevator 700.

In step S102, the mobile robot 100 may move the waiting position, before the car 750 stops at the floor or before the car door 740 opens. Further, in step S102, in the case where the destination floor for the mobile robot 100 is earlier, that is, in the case where the car 750 arrives at the destination floor for the mobile robot 100 earlier before the car 750 arrives at the destination floor for the person 610 or the object 620, the mobile robot 100 may once get off the car 750 on the floor where the person 610 or the object 620 gets on the car 750, and may get on the car 750 after the person 610 or the object 620 gets on the car 750.

Next, effects of the embodiment will be described. The mobile robot 100 in the embodiment moves the waiting position in the car 750, based on the person 610 or object 620 that gets on the car 750 of the elevator 700. Consequently, the mobile robot 100 can wait at an optimal position based on the kind of the person 610 or object 620 that gets on the car 750, and therefore, it is possible to restrain the blocking of the movement path for the person 610 or the object 620.

Further, the mobile robot 100 determines the person 610 or the object 620 and moves the waiting position, before the car 750 stops at the floor or before the car door 740 opens. Consequently, it is possible to shorten the time after the car door 740 opens and before the person 610 or the object 620 gets on the car 750, and to shorten the time during which the car 750 stops at the floor.

Furthermore, in the case where the car 750 arrives at the destination floor for the mobile robot 100 earlier before the car 750 arrives at the destination floor for the person 610 or the object 620, the mobile robot 100 once gets off the car 750 on the floor where the person 610 or the object 620 gets on the car 750, and gets on the car 750 after the person 610 or the object 620 gets on the car 750. Consequently, it is possible to restrain the interference with the person 610 or the object 620, and to safely move.

The object 620 may be another mobile robot 100, and the mobile robot 100 may acquire information about the destination floor for the other mobile robot 100, before the car 750 stops at the floor or before the car door 740 opens. Thereby, it is possible to restrain the blocking of the movement route for the person 610 or the object 620, even when a plurality of mobile robots 100 gets on the car 750.

Embodiment 2

Next, an autonomous movement system according to Embodiment 2 will be described. The autonomous movement system in the embodiment is a system that controls an autonomous movement device that performs autonomous movement in a facility 900 including an elevator 700. The autonomous movement system will be described by being divided into Configuration of Autonomous Movement System and Behavior of Autonomous Movement System.

Configuration of Autonomous Movement System

The autonomous movement system includes a mobile robot 100. The autonomous movement system may include a plurality of mobile robots 100. Further, the autonomous movement system may include a server device 300 in addition to the mobile robot 100.

Mobile Robot

The configuration of the mobile robot 100 in the embodiment is the same as that in Embodiment 1 described above. The mobile robot 100 in the embodiment may cause the server device 300 to execute some functions of the mobile robot 100 in Embodiment 1.

For example, the determination of the person 610 or object 620 that gets on the car 750 may be performed by the server device 300. On that occasion, the determination of the person 610 or object 620 may be performed before the car 750 stops at the floor or before the car door 740 opens. Further, the destination floor information about the person 610 or object 620 that gets on the car 750 may be acquired by the server device 300. Furthermore, the waiting position of the mobile robot 100 in the car 750 may be derived by the server device 300.

Server Device

For example, the server device 300 is a computer that has a communication function. The server device 300 may be installed at an arbitrary place as long as the server device 300 can communicate with constituents of the autonomous movement system. The server device 300 exchanges traveling information with the mobile robot 100. Further, the server device 300 may control the rise and fall of the car 750 of the elevator 700, by controlling the elevator control unit 780 or instead of the elevator control unit 780.

Figure 8:
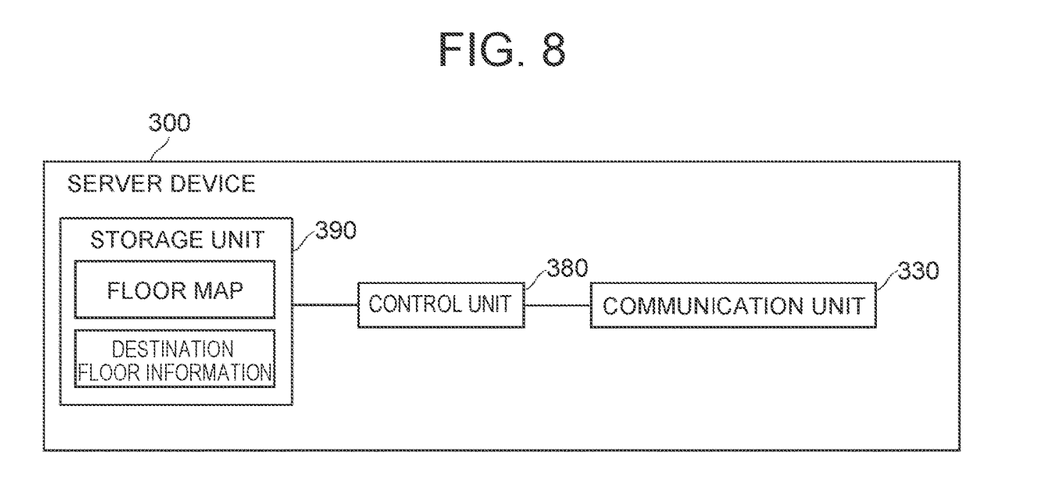
FIG. 8 is a block diagram exemplifying a server device according to Embodiment 2.

FIG. 8 is a block diagram exemplifying the server device according the Embodiment 2. As shown in FIG. 8, the server device 300 includes a communication unit 330, a control unit 380 and a storage unit 390.

The communication unit 330 individually communicates with the mobile robot 100. The communication unit 330 outputs signals received from the constituents, to the control unit 380. Further, the communication unit 330 sends signals output from the control unit 380, to constituents, when appropriate. The communication unit 330 may include a router device for communicating with the server device 300 and a plurality of constituents. The communication unit 330 may include a plurality of different communication means respectively corresponding to constituent elements in order to communicate with the server device 300 and a plurality of constituents. The communication unit 330 may be connected with the constituents through an intranet or internet line in a communicable manner.

The control unit 380 is constituted by a computation device such as a CPU, and performs various information processes. The control unit 380 may determine the person 610 or object 620 that gets on the car 750, based on the image data about the elevator hall 760. Further, the control unit 380 may acquire the destination floor information about the person 610 or object 620 that gets on the car 750. Furthermore, the control unit 380 may derive the waiting position of the mobile robot 100 in the car 750.

The storage unit 390 includes a nonvolatile memory such as a flash memory and an SSD. In the storage unit 390, the floor map of the facility that is used for the autonomous movement of the mobile robot 100 is stored. Further, the destination floor information about the person 610 or the object 620 may be stored in the storage unit 390. The storage unit 390 is connected with the control unit 380, and outputs the stored information to the control unit 380, in response to a request from the control unit 380.

Behavior of Autonomous Movement System

Figure 9:
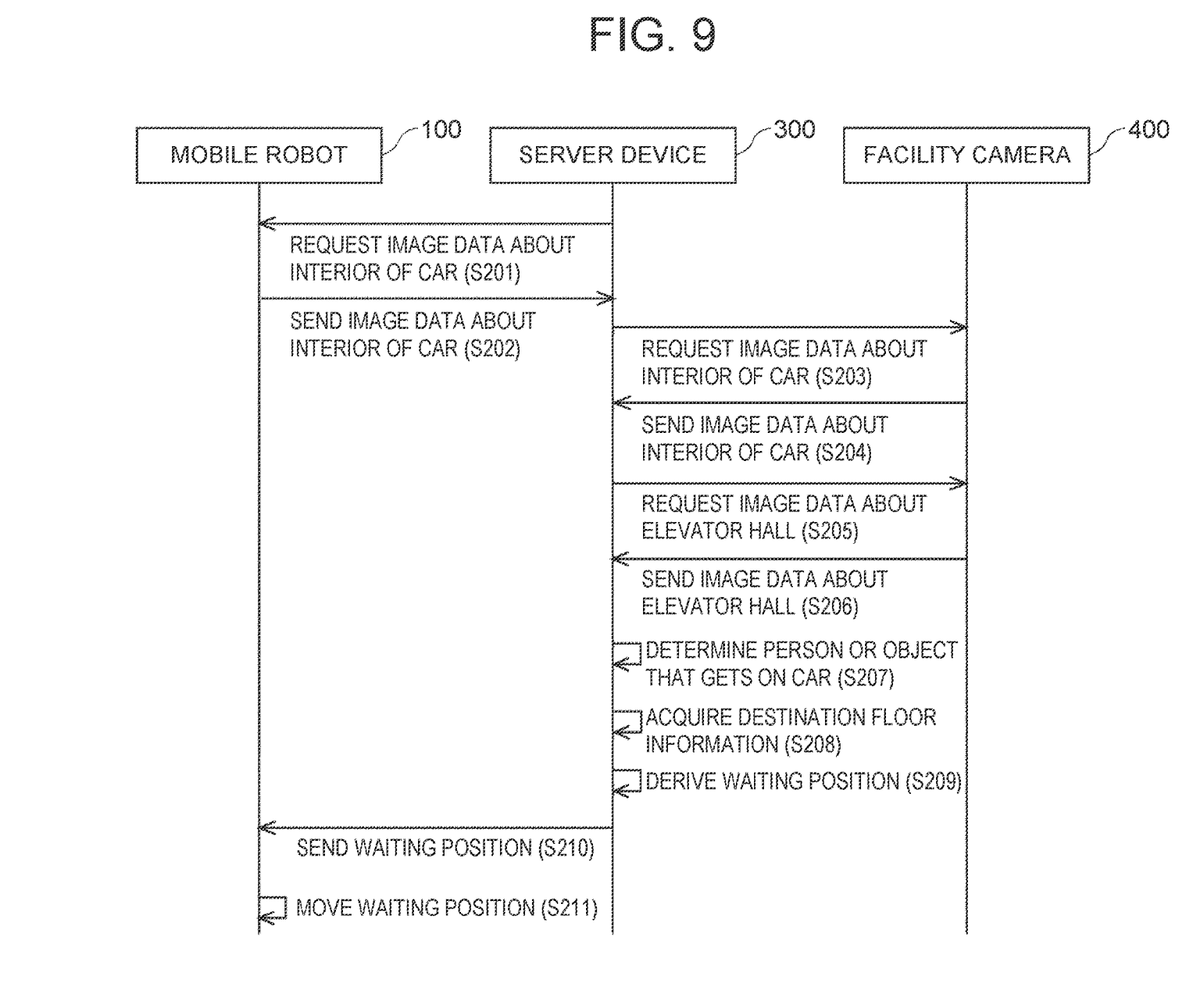
FIG. 9 is a sequence diagram exemplifying a behavior of an autonomous movement system according to Embodiment 2.

Next, a behavior of the autonomous movement system will be described. FIG. 9 is a sequence diagram exemplifying the behavior of the autonomous movement system according to Embodiment 2.

As shown in step S201 of FIG. 9, the server device 300 may request the image data about the interior of the car 750 of the elevator 700, to the mobile robot 100 in the car 750. In response to this request, as shown in step S202, the mobile robot 100 in the car 750 sends the image data about the interior of the car 750 that is photographed by the robot camera 161, to the server device 300. The server device 300 receives the image data.

Further, as shown in step S203, the server device 300 may request the image data about the interior of the car 750, to the facility camera 400 in the car 750 of the elevator 700. In response to this request, as shown in step S204, the facility camera 400 in the car 750 sends the image data about the interior of car 750, to the server device 300. The server device 300 receives the image data. By steps S201 to S204, the server device 300 acquires the waiting position of the mobile robot 100 in the car 750.

Furthermore, as shown in step S205, the server device 300 requests the image data about the elevator hall 760, to the facility camera 400 in the elevator hall 760. In response to this request, as shown in step S206, the facility camera 400 in the elevator hall 760 sends the image data about the elevator hall 760, to the server device 300. The server device 300 receives the image data. By steps S205 to S206, the server device 300 acquires the image data about the person 610 or object 620 that gets on the car 750.

Next, as shown in step S207, the server device 300 determines the person 610 or object 620 that gets on the car 750 of the elevator 700. Further, as shown in step S208, the server device 300 may acquire the information about the destination floor for the person 610 or object 620 that gets on the car 750.

Next, as shown in step S209, the server device 300 derives the waiting position of the mobile robot 100 in the car 750, from the determination result and destination floor information about the person 610 or object 620 that gets on the car 750.

Next, as shown in step S210, the server device 300 sends the waiting position, to the mobile robot 100 in the car 750. The mobile robot 100 in the car 750 receives the waiting position. Thereby, as shown in step S211, the mobile robot 100 in the car 750 moves the waiting position.

With the embodiment, the server device 300 can move the waiting position of the mobile robot 100 in the car 750, based on the person that gets on the car 750 of the elevator 700 or the object 620 that gets on the car 750. Consequently, it is possible to restrain the blocking of the movement route for the person 610 or the object 620.

Further, the server device 300 can bear some functions of the mobile robot 100. Consequently, it is possible to reduce the burden on the mobile robot 100, and to enhance the processing speed of the mobile robot 100. Further, the server device 300 can integrally control the behaviors of a plurality of mobile robots 100. Therefore, it is possible to coordinate the behaviors of the mobile robots 100, and to enhance the whole movement efficiency of the system. The other configurations, behaviors and effects are included in the description of Embodiment 1.

The present disclosure is not limited to the above embodiments, and can be appropriately modified without departing from the spirit. For example, combinations of constituents in Embodiment 1 and Embodiment 2 are included in the scope of the technical idea of the present disclosure. Further, autonomous movement methods and autonomous movement programs described below are included in the scope of the technical idea of the present disclosure.

Supplement 1

An autonomous movement method for an autonomous movement device that performs autonomous movement in a facility including an elevator, the autonomous movement method comprising:

a step of determining, in a car of the elevator, a person that gets on the car or an object that gets on the car; and a step of moving a waiting position in the car, based on the person or the object.

Supplement 2

The autonomous movement method according to supplement 1, wherein:
in the step of determining the person or the object, the person or the object is determined before the car stops at a floor or before a door of the car opens; and
in the step of moving the waiting position in the car, the waiting position is moved before the car stops at the floor or before the door of the car opens.

Supplement 3

The autonomous movement method according to supplement 1 or 2, wherein:
in the step of determining the person or the object, it is determined whether the car arrives at a destination floor for the autonomous movement device before the car arrives at a destination floor for the person or the object; and
in the step of moving the waiting position in the car, the autonomous movement device once gets off the car on a floor where the person or the object gets on the car, and gets on the car after the person or the object gets on the car.

Supplement 4

The autonomous movement method according to any one of supplements 1 to 3, wherein:
the object is another autonomous movement device; and
in the step of determining the person or the object, information about a destination floor for the other autonomous movement device is acquired before the car stops at a floor or before a door of the car opens.

Supplement 5

An autonomous movement program for an autonomous movement device that performs autonomous movement in a facility including an elevator, the autonomous movement program causing a computer to execute:
determining, in a car of the elevator, a person that gets on the car or an object that gets on the car; and
moving a waiting position in the car, based on the person or the object.

Supplement 6

The autonomous movement program according to supplement 5, wherein:
in determining the person or the object, the computer determines the person or the object before the car stops at a floor or before a door of the car opens; and
in moving the waiting position in the car, the computer moves the waiting position before the car stops at the floor or before the door of the car opens.

Supplement 7

The autonomous movement program according to supplement 5 or 6, wherein:
in determining the person or the object, the computer determines whether the car arrives at a destination floor for the autonomous movement device before the car arrives at a destination floor for the person or the object; and
in moving the waiting position in the car, the computer causes the autonomous movement device to once get off the car on a floor where the person or the object gets on the car, and causes the autonomous movement device to get on the car after the person or the object gets on the car.

Supplement 8

The autonomous movement program according to any one of supplements 5 to 7, wherein:
the object is another autonomous movement device; and
in determining the person or the object, the computer acquires information about a destination floor for the other autonomous movement device, before the car stops at a floor or before a door of the car opens.

What is claimed is:

1. An autonomous movement system that performs autonomous movement in a facility including an elevator, wherein the autonomous movement system moves an autonomous movement device to a waiting position in a car of the elevator, based on a person that gets on the car or an object that gets on the car;
the autonomous movement system determines the person or the object before the car stops at a floor or before a door of the car opens, and
the autonomous movement system
(i) moves the autonomous movement device in the car to the waiting position such that the autonomous movement devices array along a direction in which the object extends before the car stops at the floor or before the door of the car opens, the object being a stretcher, or
(ii) in the case where the autonomous movement system determines the person uses a handrail in the car, moves the autonomous movement device in the car to the waiting portion positioning at a predetermined distance away from the handrail before the car stops at the floor or before the door of the car opens.

2. The autonomous movement system according to claim 1, wherein in a case where the car arrives at a destination floor for the autonomous movement system before the car arrives at a destination floor for the person or the object, the autonomous movement system once gets off the car on a floor where the person or the object gets on the car, and gets on the car after the person or the object gets on the car.

3. The autonomous movement system according to claim 1, wherein:
the object is another autonomous movement system; and
the autonomous movement system acquires information about a destination floor for the other autonomous movement system, before the car stops at a floor or before a door of the car opens.

4. The autonomous movement system according to claim 1, wherein
the autonomous movement system moves the autonomous movement device in the car to the waiting position to provide a space in a front of a destination switch such that a person can push the destination switch, before the car stops at the floor or before the door of the car opens.

5. The autonomous movement system according to claim 1, wherein
the autonomous movement system moves the autonomous movement device in the car to the waiting position such that the autonomous movement devices array along a direction in which the object extends before the car stops at the floor or before the door of the car opens.

6. The autonomous movement system according to claim 1, wherein
in the case where the autonomous movement system determines the person uses a handrail in the car, the autonomous movement system moves the autonomous movement device in the car to the waiting position from a vicinity of the handrail to the front of a car door before the car stops at the floor or before the door of the car opens.

7. The autonomous movement system according to claim 1, wherein
in the case where the handrail is provided at a back of the car and the autonomous movement system determines the person uses the handrail in the car, moves the autonomous movement device in the car to the front of a car door before the car stops at the floor or before the door of the car opens.

8. The autonomous movement system according to claim 1, wherein the autonomous movement system acquires image data about an elevator hall, and determines whether the person is an old person or a patient, or whether the object is a stretcher.

9. The autonomous movement system according to claim 1, wherein the autonomous movement system determines:
an object that gets on the car is a stretcher with a destination of an intensive-care unit, and acquires information about a destination floor for the stretcher from a server or a storage unit;
an object that gets on the car is a container that contains waste, and acquires information about a destination floor for the container from the server or the storage unit; or
a person that gets on the car is a patient that uses a particular patient room, and acquires information about a destination floor for the patient from the server or the storage unit.

10. An autonomous movement system comprising:
an autonomous movement device that performs autonomous movement in a facility including an elevator; and
a server device that exchanges traveling information with the autonomous movement device, wherein
the server device moves a waiting position of the autonomous movement device in a car of the elevator, based on a person that gets on the car or an object that gets on the car;
the server device transmits, to the autonomous movement device, a signal to
(i) move the autonomous movement device in the car to the waiting position such that the autonomous movement devices are arrayed along a direction in which the object extends before the car stops at the floor or before the door of the car opens, the object being a stretcher, or
(ii) in the case where the server device determines the person uses a handrail in the car, move the autonomous movement device in the car to the waiting portion positioning at a predetermined distance away from the handrail before the car stops at the floor or before the door of the car opens;
the autonomous movement device in the car moves the waiting position before the car stops at the floor or before the door of the car opens.

11. The autonomous movement system according to claim 10, wherein in a case where the car arrives at a destination floor for the autonomous movement device before the car arrives at a destination floor for the person or the object, the server device causes the autonomous movement device to once get off the car on a floor where the person or the object gets on the car, and causes the autonomous movement device to get on the car after the person or the object gets on the car.

12. The autonomous movement system according to claim 10, wherein:
as the autonomous movement device, there is a plurality of autonomous movement devices including a first autonomous movement device and a second autonomous movement device;
the autonomous movement device in the car is the first autonomous movement device;
the object is the second autonomous movement device; and
the server device sends information about a destination floor for the second autonomous movement device to the first autonomous movement device, before the car stops at a floor or before a door of the car opens.

13. An autonomous movement method for an autonomous movement device that performs autonomous movement in a facility including an elevator, the autonomous movement method comprising:
a step of determining, in a car of the elevator, a person that gets on the car or an object that gets on the car;
a step of moving a waiting position in the car, based on the person or the object;
a step of determining the person or the object before the car stops at a floor or before a door of the car opens; and
a step of:
(i) moving the autonomous movement device in the car to the autonomous movement device such that the autonomous movement devices are arrayed along a direction in which the object extends before the car stops at the floor or before the door of the car opens, the object being a stretcher, or
(ii) moving the autonomous movement device in the car to the waiting portion positioning at a predetermined distance away from the handrail before the car stops at the floor or before the door of the car opens, in the case where it is determined that the person uses the handrail in the car.

14. A non-transitory storage medium storing instructions that are executable by one or more processors and that cause the one or more processors to perform functions comprising:
determining, in a car of the elevator, a person that gets on the car or an object that gets on the car;
determining the person or the object before the car stops at a floor or before a door of the car opens; and
(i) moving the autonomous movement device in the car to the waiting position such that the autonomous movement devices is are arrayed along a direction in which the object extends before the car stops at the floor or before the door of the car opens, the object being a stretcher, or
(ii) in the case where it is determined that the person uses a handrail in the car, moving the autonomous movement device in the car to the waiting position from a vicinity of the handrail to the front of a car door before the car stops at the floor or before the door of the car opens.

* * * * *